United States Patent [19]

Dougherty

[11] Patent Number: 4,967,304
[45] Date of Patent: Oct. 30, 1990

[54] DIGITAL CIRCUIT INTERRUPTER WITH ELECTRIC MOTOR TRIP PARAMETERS

[75] Inventor: John J. Dougherty, Avon, Conn.

[73] Assignee: General Electric Company, New York, N.Y.

[21] Appl. No.: 256,357

[22] Filed: Oct. 11, 1988

[51] Int. Cl.⁵ .................................................. H02H 5/00
[52] U.S. Cl. ........................................... 361/31; 361/93; 361/94; 364/483
[58] Field of Search ................. 361/87, 93, 31, 95, 361/96, 28, 94; 364/483

[56] References Cited

U.S. PATENT DOCUMENTS

| | | | |
|---|---|---|---|
| 4,266,259 | 5/1981 | Howell | 361/97 |
| 4,275,445 | 6/1981 | Elizaran | 364/480 |
| 4,430,682 | 2/1984 | Babsch | 361/31 |
| 4,509,088 | 4/1985 | Profio | 361/29 |
| 4,527,214 | 7/1985 | Hattori et al. | 361/94 X |
| 4,672,501 | 6/1987 | Bilac et al. | 361/96 |
| 4,694,374 | 9/1987 | Verbanets, Jr. | 361/96 |
| 4,717,985 | 1/1988 | Demeyer | 361/96 |

Primary Examiner—Derek S. Jennings
Attorney, Agent, or Firm—Richard A. Menelly; Walter C. Bernkopf; Fred Jacob

[57] ABSTRACT

A digital circuit interrupter includes a microprocessor programmed for tailored overcurrent protection to industrial power systems containing a plurality of electric motors as well as motor protective relays. A communication link permits the overcurrent set points to be selectively set within the microprocessor memory from a remote location. The tailored overcurrent motor trip parameters are then derived by means of a logarithmic interpolation algorithm which resides in the microprocessor memory.

11 Claims, 4 Drawing Sheets

FIG. 1 - (PRIOR ART)

DIGITAL CIRCUIT INTERRUPTER WITH ELECTRIC MOTOR TRIP PARAMETERS

BACKGROUND OF THE INVENTION

Industrial power circuit protection is currently provided by thermal, magnetic, electromechanical and electronic circuit interruption devices tailored to respond to an inverse time-overcurrent function. A long-time delay before circuit interruption is provided for a low overload current value while a shorter time delay is provided for a higher overload current. Upon the occurrence of a short circuit current, the circuit must be interrupted instantaneously.

The thermal and magnetic trip units used within circuit breakers fairly approximate a time-overcurrent relationship which varies with the first power of time and with the second power of current ($I^2t$), whereas the magnetic induction discs used within electromechanical relays, for example, follow a polynomial relationship between current and time approximating the $I^2t$ relation to a lesser extent. A good description of the operation of an electromechanical relay is found within a paper entitled "Digital Inverse Time Overcurrent Relay Using Counters" by M. Ramamoorty, which appeared in the ECI Journal, EL, 1980.

Time-overcurrent trip parameters for electronic circuit interruption devices of the so-called "analog" type use the delay characteristics of an electronic component such as a capacitor to determine the longtime and short-time delays before circuit interruption. U.S. Pat. No. 4,266,259 describes one such analog circuit interrupter.

Time-overcurrent trip parameters for electronic circuit interrupters of the so-called "digital" type are stored in electronic memory and are utilized within a microprocessor to provide long-time and short-time interruption. One example of a digital circuit interrupter is found within U.S. Pat. No. 4,672,501.

When an electronic circuit interrupter is used as a main circuit interrupter within power distribution systems employing magnetic induction discs within branch circuits, some means of coordination is ordinarily required in order for the magnetic induction disc closest to the fault to interrupt the branch circuit before the electronic circuit interrupter responds to interrupt the main circuit.

U.S. patent application Ser. No. (41PR-6558) entitled "Digital Circuit Interrupter with Selectable Trip Parameters" describes logarithmic and linear interpolation algorithms used to tailor a trip-time curve to coordinate with non-electronic circuit interruption devices. This application is incorporated herein for purposes of reference.

Such electronic circuit interrupters having triptime curves tailored to protect industrial power distribution systems, find only limited application in those systems containing large electric motors. For example, a high in-rush current is required during the starting phase of the electric motor, which appears to the electronic circuit interrupter as a short-time fault condition. The electronic circuit interrupter begins timing out a short-time fault and, in some instances, can interrupt the circuit before the motor current subsides to a low, steady state condition.

Prior Art thermal overload relays and magnetic relays as well as dual element fuses can be selected to provide adequate motor protection without interrupting the circuit during the initial high in-rush currents during motor starting.

An early attempt to employ an electronic circuit interrupter having a trip-time characteristic similar to a magnetic induction disc is found within U.S. Pat. No. 4,275,445. Electronic circuit interrupters having both overcurrent protection as well as protective relay function are found in U.S. Pat. No. 4,509,088 which Patent is incorporated herein for purposes of reference.

The present invention improves over electronic circuit interrupters and magnetic relays by providing a time-trip curve specifically tailored for circuits employing electric motors.

SUMMARY OF THE INVENTION

A time-trip curve is tailored for use within digital circuit interrupters providing electric motor protection. Six points on an idealized motor time-overcurrent curve are logarithmically or linearly interpolated by means of an interpolation algorithm to provide a continuous curve specifically tailored for electric motor protection.

DESCRIPTION OF THE PREFERRED EMBODIMENT

Before describing the tailored electric motor triptime curve in accordance with the invention, it is helpful to compare the trip-time curves for a thermal overload relay 10 and magnetic induction disc 11 to a standard electronic circuit interrupter 12. It is noted that the thermal overload relay provides a long-time delay for low current overload conditions whereas the magnetic induction disc provides a long-time delay for high overcurrent conditions. The electronic circuit interrupter provides a shorter time delay at low overload current conditions than the thermal relay while providing a shorter time delay than either the electric or magnetic relay at high overload current conditions.

Figure 1:
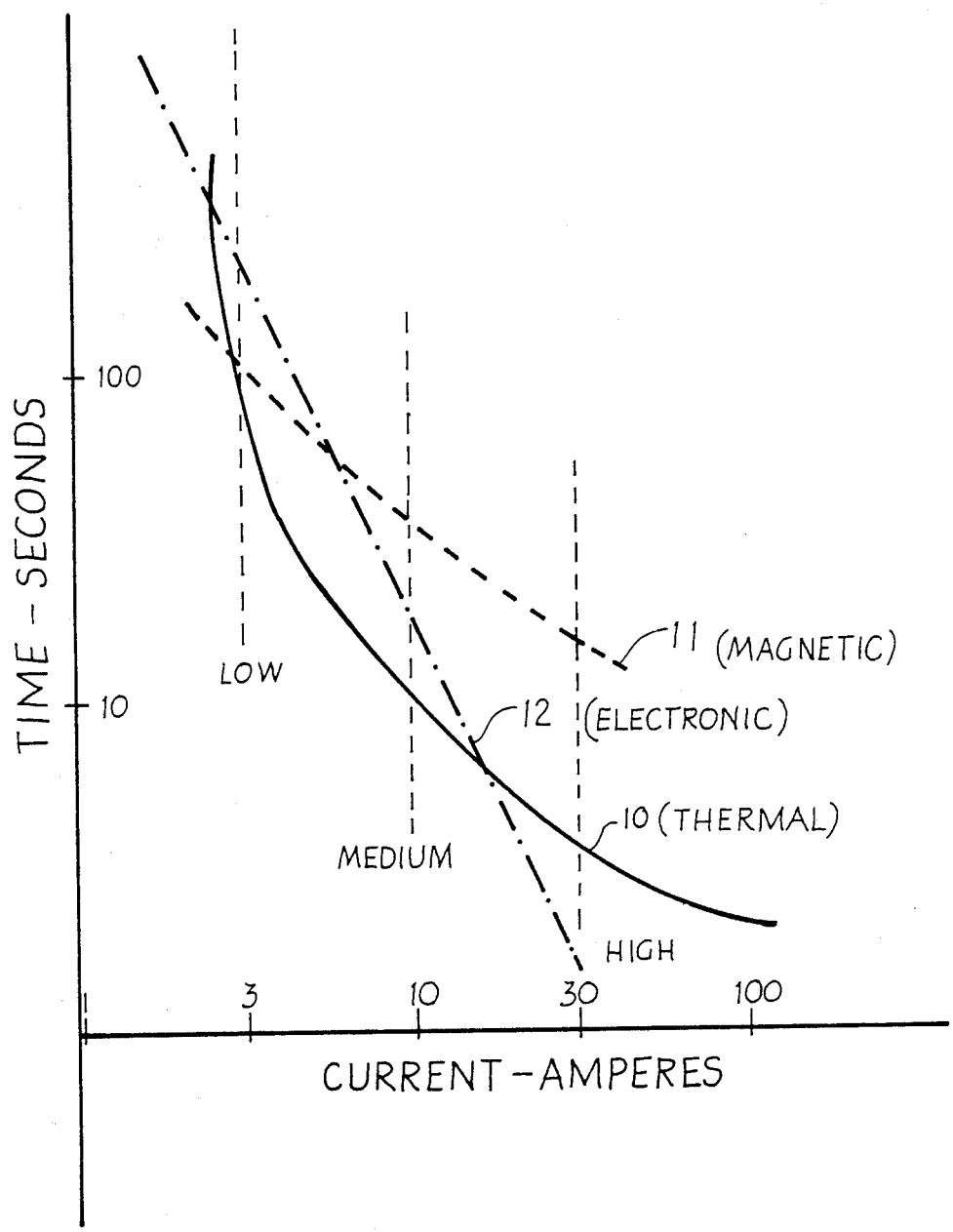
FIG. 1 is a graphic representation of the trip-time curves for a magnetic induction disc, a thermal relay and an electronic circuit interrupter according to the Prior Art.
Figure 2:
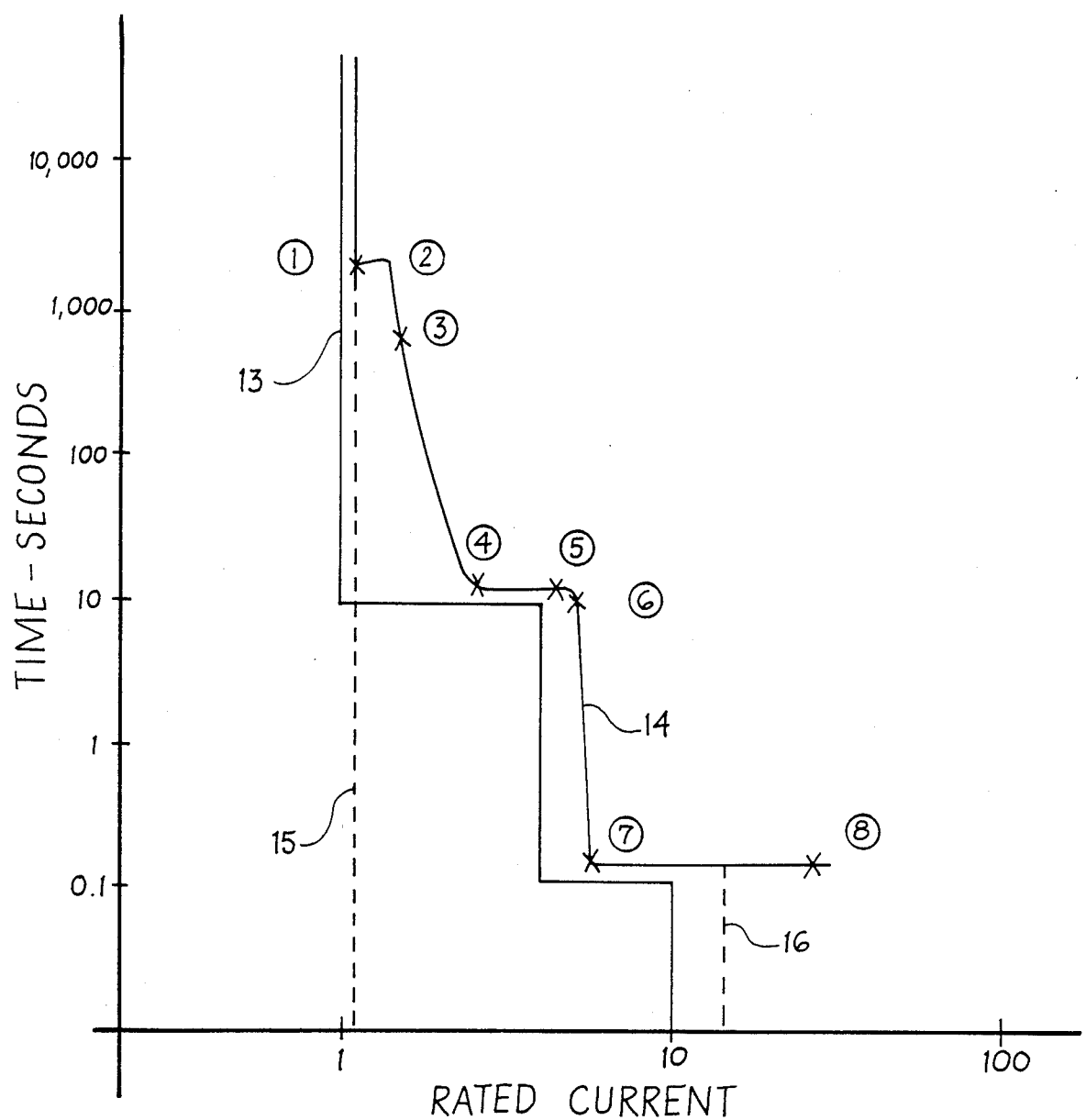
FIG. 2 is a graphic representation of a trip-time time curve comparing the tailored motor protection curve according to the invention to an idealized motor trip-time curve.

The starting and operating motor performance curve 13 for a high efficiency motor and the tailored motor protection curve 14 depicted in FIG. 2 are both expressed as a time function of multiples of rated current. The so-called "long-time" overcurrent is set at ten seconds for the corresponding multiples of current indicated whereas the "short-time" overcurrent is set at 0.1 second for the corresponding multiples of rated motor current indicated. A long-time pickup threshold indicated at 15 is set at a factor of 1.1 times the rated current whereas instantaneous tripping occurs in excess of ten times the rated current. Indicated points 1–8 each comprise fixed points tailored to an optimum operating characteristic based on the electric motor performance curve 13. The points are selected as follows: Points 1–4 define the long-time running overload profile which improves on that recommended by the manufacturer before overheating occurs. Points 4–7 define the intermediate time acceleration-permitting profile wherein the motor in-rush current increases until magnetization of the motor has occurred. Points 7 and 8 define the short-circuit overcurrent profile with the instantaneous interruption point set at 16. Point 1 defines the steady state operating current for the motor which sets the rated motor current value. Points 1 and 2 set a minimum running overload of approximately 1800 seconds for all overloads up to Point 2, which is set at 1.2 times the rated motor current. Point 3 is an interim point on the tailored trip curve 14 and varies with the service factor of the specific motor characteristics. This point determines the shape of the curve in the overload region. Point 4 is selected at approximately two times the rated motor current and can vary from 1.6 to 3.0 times the rated motor current depending upon an anticipated overload duration. Points 5 and 6 provide a low, fixed, clearing time for high slip, near-stall conditions of the motor. It is similar to the short-time pickup region of conventional electronic circuit interrupters and is determined by the worst case in-rush current during motor start-up. Points 7 and 8 set the lower time boundary for the tailored motor trip curve for bolted fault protection slightly above the maximum motor in-rush current. The main advantage of the tailored trip curve is in the region defined by points 2 through 7. The sharp decrease in trip-time from 1.2× to 3× is well within the thermal curve 10 of FIG. 1 for a conventional motor relay. If set lower, the thermal curve would intersect the acceleration-permitting profile of the motor defined between points 4–7 as described earlier. The ability to re-construct curve 14 accordingly allows optimal running overload protection, full acceleration current and short-time protection beyond acceleration current.

The portions of the tailored motor curve between the fixed points 1–8 are obtained by applying the following logarithmic interpolation algorithm to the fixed points.

$$Tx = T(i-1) + (T(i) - T(i-1)) *$$
$$0.9954 * \log10(1 + 10 * I^2 - I(i-1)^2)/I(i)^2 - I(i-1)^2))$$

where

Tx is the interpolated trip-time;
Ix is the fault current;
T(i−1) is the trip-time at I(i−1);
I(i−1) is the current of the nearest fixed point below the fault current;
T(i) is the trip-time at I(i);
I(i) is the current of the nearest fixed point above the fault current;
0.9954 is a scaling constant (1/log10(11)).

Figure 3:
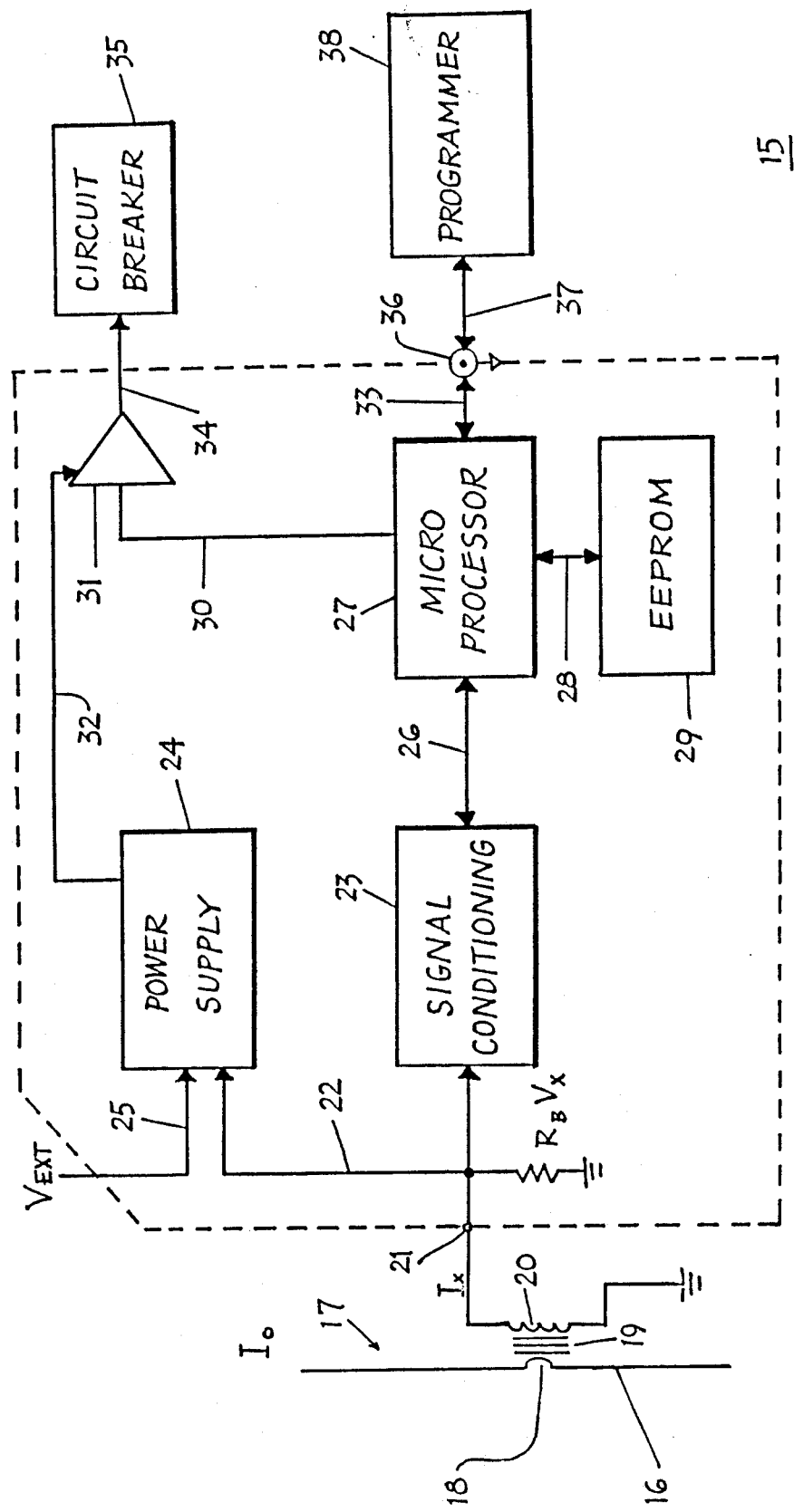
FIG. 3 is a diagrammatic representation of an electronic circuit interrupter employing the tailored electric motor trip-time curve depicted in FIG. 2.

A digital circuit interrupter 15 for implementing the tailored motor protection curve 14 of FIG. 2 is depicted in FIG. 3. The circuit interrupter is similar to that described within the aforementioned U.S. Pat. No. 4,672,501 wherein the circuit current $I_o$ flowing in one conductor 16 of a three-phase power distribution circuit is sampled by means of a current transformer 17 having a primary winding 18 arranged in series with the power conductor and a core 19. Although only one such power conductor and current transformer is shown, a separate power conductor and current transformer is employed for each separate phase of the three-phase power distribution system. The secondary winding 20 is connected with the digital circuit interrupter 15 by means of terminal connector 21. A corresponding voltage signal $V_x$ is generated across a burden resistor RB in proportion to the secondary current. The voltage signal is directed over conductor 22 to the signal conditioning circuit 23 and to a power supply circuit 24 providing operating power to the other components within the circuit. An auxiliary source of power $V_{EXT}$ feeds the power supply circuit over conductor 25. The voltage signal is transmitted to a microprocessor 27 over data bus 26 for determining the occurrence of an overcurrent condition. The fixed points (1–8) taken from the tailored motor protection curve 14 are stored in the EEPROM Memory 29 which connects with the processor circuit 27 over data bus 28.

The instructions to the processor are inputted from an external programmer 38 which temporarily connects with the processor by means of data bus 37, terminal connector 36 and data bus 33. Upon exceeding a predetermined current condition for a calculated time period, a trip signal is outputted from the processor to a buffer 31 over conductor 30 and from the buffer to the circuit breaker 35 over conductor 34. The buffer is powered by connection with the power supply 24 over conductor 32. The programmer 38 contains a separate microprocessor from that contained within the processor 27 and is described within the aforementioned U.S. Pat. No. 4,672,501. Upon receipt of an overcurrent condition on data bus 26, the processor calculates the corresponding trip-time by reading the fixed points stored in the EEPROM and stores these points in the volatile memory contained within the processor. The processor then interpolates the integration rate that corresponds to the desired trip-time in accordance with the tailored motor protection curve 14. The processor provides the trip output signal to the circuit breaker after timing out the calculated trip-time. The programmer 38 can include a digital communication link over data bus 37 as part of the factory-installed digital circuit interrupter or can be a remote field operable device, such as described within U.S. patent application Ser. No. 232,035 if so desired.

Figure 4:
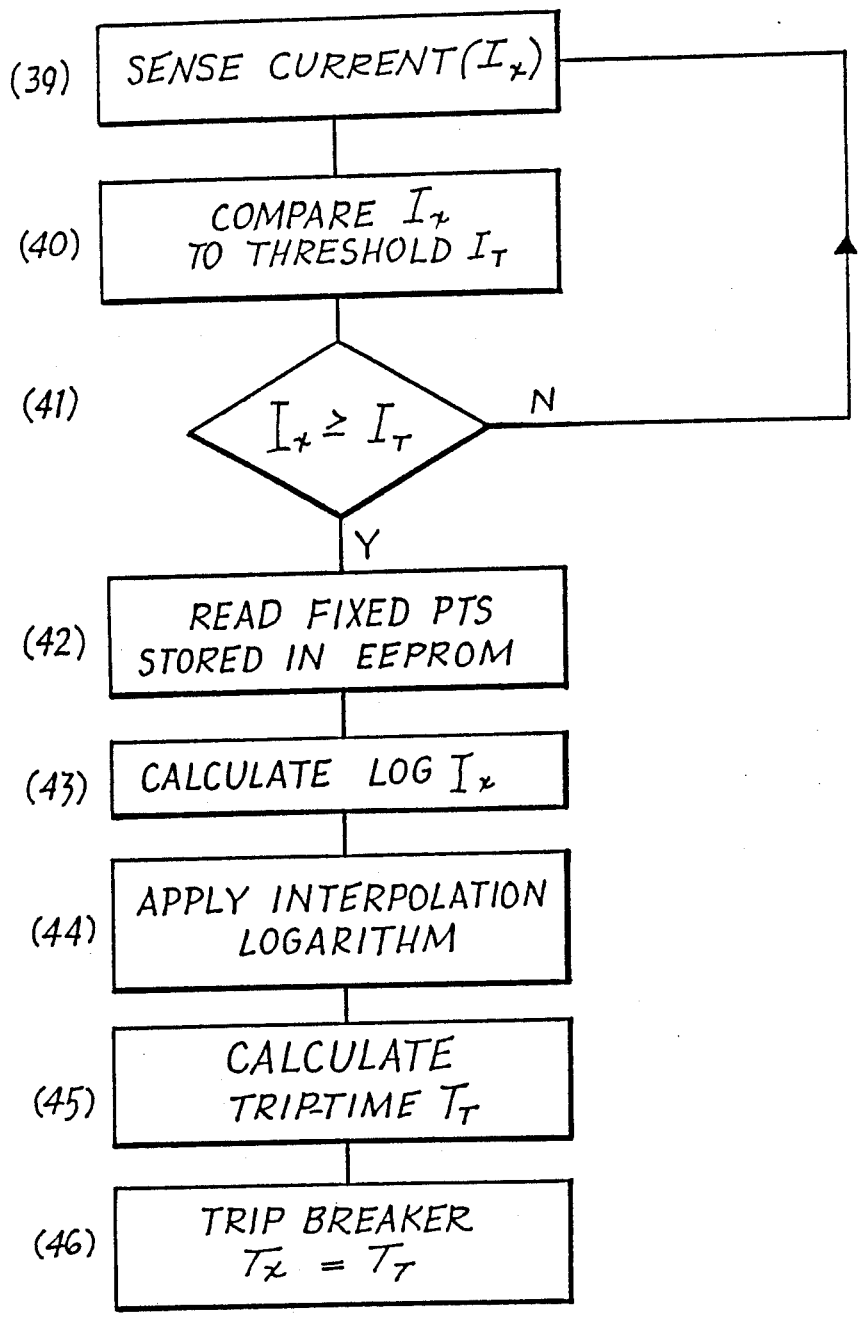
FIG. 4 is a flow chart representation of the Application of the tailored motor protection trip-time curve of FIG. 2 within the circuit interrupter of FIG. 3.

The operation of the circuit interrupter is best seen by now referring to both the flow diagram depicted in FIG. 4 and the digital circuit interrupter 15 shown in FIG. 3. The circuit current $I_o$ is sensed continuously (39) as $I_x$ and is inputted to the processor 27 over the data bus 26. The current signal is compared to a threshold value $I_T$ (40) to determine the occurrence of an overcurrent condition. Upon the occurrence of an overcurrent condition (41) the processor reads the fixed points stored in the EEPROM (42) and calculates the logarithmic value of the current signal $I_x$ (43). The interpolation algorithm is applied (44) and the trip-time $T_t$ is calculated (45). After timing out the calculated trip-time, a trip signal (46) is supplied to the circuit breaker 35 through the buffer 31 and conductors 30, 34 to interrupt the circuit.

A tailored motor protection curve has herein been described for a digital circuit interrupter used with electric motors directly or coordinated with downstream or branch circuits employing thermal and magnetic circuit relays. The microprocessor within the digital circuit interrupter is accessed by means of a programmer for introducing fixed set points to the microprocessor and for storing the set points in an associated EEPROM.

Having thus described my invention, what I claim as new and desire to secure by Letters Patent is:

1. A digital circuit interrupter for electric motor protection comprising:
    circuit current sensing means;
    a signal conditioning circuit for converting circuit current to a corresponding voltage signal;
    a signal processor connected with said signal conditioning circuit for comparing said corresponding voltage signal to calculate trip parameters and interrupting said circuit current when said corresponding voltage signal exceeds said calculated trip parameters; and
    memory means connected with said signal processor, said memory means containing predetermined time and current data points corresponding to an electric motor protection profile and algorithm means for interpolating between said predetermined data points to provide said calculated trip parameters said algorithm means comprising a logarithmic interpolation algorithm.

2. The digital circuit interrupter of claim 1 wherein said signal processor comprises a microprocessor.

3. The digital circuit interrupter of claim 2 including programmer means for inputting said time and current data points to said microprocessor.

4. The digital circuit interrupter of claim 1 wherein said motor time and current parameters are derived from thermal and magnetic motor protection relays.

5. A digital circuit interrupter for electric motor protection comprising:
    circuit current sensing means;
    a signal conditioning circuit for converting circuit current to a corresponding voltage signal;
    a signal processor connected with said signal conditioning circuit for comparing said corresponding voltage signal to calculated trip parameters and interrupting said circuit current when said corresponding voltage signal exceeds said calculated trip parameters; and
    memory means connected with said signal processor, said memory means comprising an electrically erasable memory containing predetermined time and current data points corresponding to an electric motor protection profile and algorithm means for interpolating between said predetermined data points to provide said calculated trip parameters said algorithm means comprising a linear or logarithmic interpolation algorithm.

6. A method of protecting electric motors within an electrical power distribution system comprising the steps of:
    connecting a circuit interrupter including a microprocessor and associated memory within an electrical power distribution system containing at least one electric motor having an overload capability and an acceleration current profile;
    inputting a plurality of motor protection time and current parameters to said memory from an external programmer;
    determining circuit current through said electric motor;
    comparing said circuit current to said time and curret parameters;
    applying logarithmic interpolation algorithm to said stored parameters to provide a continuous safe-operating trip-time curve for said electric motor; and
    interrupting said circuit current when said circuit current exceeds a predetermined current for a time in excess of said safe-operating time.

7. The method of claim 6 wherein said safe-operating trip-time curve is determined by said overload capability of said motor.

8. The method of claim 6 wherein said safe-operating trip-time curve is determined by said acceleration current profile of said motor.

9. A method of protecting electric motors within an electrical power distribution system comprising the steps of:
    connecting a circuit interrupter including a microprocessor and associated memory within an electrical power distribution system containing at least one electric motor having an overload capability and an acceleration current profile;
    inputting a plurality of motor protection time and current parameters to said memory from an external programmer;
    said external programmer being temporarily connected to said microprocessor for inputting said time and current parameters and is then disconnected therefrom;
    determining circuit current through said electric motor;
    comparing said circuit current to said time and current parameters;
    applying an interpolation algorithm to said stored parameters to provide a continuous safe-operating trip-time curve for said electric motor; and
    interrupting said circuit current when said circuit current exceeds a predetermined current for a time in excess of said safe-operating time.

10. A method of protecting electric motors within an electrical power distribution system comprising the steps of:
    connecting a circuit interrupter including a microprocessor and associated memory within an electrical power distribution system containing at least one electric motor having an overload capability and an acceleration current profile;
    inputting a plurality of motor protection time and current parameters to said memory from an external programmer;
    determining circuit current through said electric motor;
    comparing said circuit current to said time and current parameters;
    applying an interpolation algorithm to said stored parameters to provide a continuous safe-operating trip-time curve for said electric motor;
    interrupting said circuit current when said circuit current exceeds a predetermined current for a time in excess of said safe-operating time; and
    removing said external programmer after said motor protection time and current parameters are inputted to said memory.

11. A method of protecting electric motors within an electrical power distribution system comprising the steps of:
    connecting a circuit interrupter including a microprocessor and associated memory within an electrical power distribution system containing at least one electric motor having an overload capability and an acceleration current profile.
    said memory comprising electrically erasable memory;

inputting a plurality of motor protection time and current parameters to said memory from an external programmer;
determining circuit current through said electric motor;
comparing said circuit current to said time and current parameters;
applying an interpolation algorithm to said stored parameters to provide a continuous safe-operating trip-time curve for said electric motor; and
interrupting said circuit current when said circuit current exceeds a predetermined current for a time in excess of said safe-operating time.

* * * * *